United States Patent
Li

(10) Patent No.: US 10,267,346 B2
(45) Date of Patent: Apr. 23, 2019

(54) EXPANDABLE FIXING DEVICE

(71) Applicant: Chi Li, New Taipei (TW)

(72) Inventor: Chi Li, New Taipei (TW)

( * ) Notice: Subject to any disclaimer, the term of this patent is extended or adjusted under 35 U.S.C. 154(b) by 120 days.

(21) Appl. No.: 15/472,011

(22) Filed: Mar. 28, 2017

(65) Prior Publication Data
US 2017/0306998 A1    Oct. 26, 2017

(30) Foreign Application Priority Data
Apr. 25, 2016    (TW) .............................. 105112764 A

(51) Int. Cl.
*F16B 13/06*    (2006.01)
*F16B 13/12*    (2006.01)

(52) U.S. Cl.
CPC .......... *F16B 13/066* (2013.01); *F16B 13/124* (2013.01); *F16B 13/128* (2013.01); *F16B 13/126* (2013.01)

(58) Field of Classification Search
USPC .......................................................... 411/55
See application file for complete search history.

(56) References Cited

U.S. PATENT DOCUMENTS

| | | | | |
|---|---|---|---|---|
| 2,463,859 A * | 3/1949 | Engstrom | ............. | F16B 39/023 411/17 |
| 2,479,075 A * | 8/1949 | Martin | .................. | F16B 39/023 411/265 |
| 2,721,276 A * | 10/1955 | Exner | ..................... | F23N 5/082 236/15 BR |
| 2,871,749 A * | 2/1959 | Kalb | ..................... | F16B 13/124 411/80.1 |
| 3,042,094 A * | 7/1962 | Liljeberg | .............. | F16B 13/066 411/271 |
| 3,143,917 A * | 8/1964 | Conner | ............... | F16B 13/0858 411/271 |
| 6,739,813 B1 * | 5/2004 | Gundy | .................... | F16B 13/02 411/377 |
| 6,908,271 B2 * | 6/2005 | Breslin | ................. | F16B 13/126 411/271 |
| 7,165,924 B1 * | 1/2007 | Breslin | ................. | F16B 13/126 411/271 |

(Continued)

FOREIGN PATENT DOCUMENTS

| CN | 104879361 A | 9/2015 |
|---|---|---|
| KR | 200355371 | 7/2004 |

*Primary Examiner* — Gary W Estremsky
(74) *Attorney, Agent, or Firm* — Rosenberg, Klein & Lee

(57) ABSTRACT

An expandable fixing device contains: a first screw and a second screw. The first screw includes a first head portion and a first extension extending downwardly from the first head portion, the first extension has first threads formed on the first head portion, the first screw further includes a screwing orifice defined in the first head portion and multiple slots formed on the first extension, and the first extension has multiple expansion portions formed on a distal end thereof and intersecting with the multiple slots. The second screw includes a second head portion and a second extension extending downwardly from the second head portion, and the second extension has second threads formed on an outer wall thereof, wherein the second extension has a strike stem and inserting into the screwing orifice via the first screw and pushes the multiple expansion portions to expand outwardly.

3 Claims, 7 Drawing Sheets

(56) References Cited

U.S. PATENT DOCUMENTS 8,486,120 B2 * 7/2013 Shimko ............... A61C 8/0074
411/55
8,740,527 B2 * 6/2014 Cheng .................. F16B 13/061
411/29

* cited by examiner

EXPANDABLE FIXING DEVICE

FIELD OF THE INVENTION

The present invention relates to an expandable fixing device which contains the first screw and the second screw, and the aperture is drilled on the wall so that the first screw and the second screw are screwed into the wall easily via the aperture, thus avoiding hammering the first screw and the second screw into the wall.

BACKGROUND OF THE INVENTION

An conventional expandable screw contains a fitting sleeve, a threaded extension inserted into the fitting sleeve, and a nut screwed with the threaded extension, wherein the threaded extension has an expansion segment, the threaded extension moves outwardly by rotating the nut after inserting into an aperture of a wall, and the expansion segment of the threaded extension forces a bottom of the fitting sleeve to expend outwardly so that the fitting sleeve abuts against the aperture, hence the expandable screw is fixed in the aperture.

However, drilling the aperture on the wall by using a drill head of an electric drill is required, and a diameter of the aperture has to mate with a diameter and a length of the expandable screw.

Furthermore, the drill head of the electric drill is broken after repeated use.

A hammer hammers the expandable screw into the aperture, thus causing damage of the expandable screw.

The present invention has arisen to mitigate and/or obviate the afore-described disadvantages.

SUMMARY OF THE INVENTION

The primary objective of the present invention is to provide an expandable fixing device which contains the first screw and the second screw, and the aperture is drilled on the wall so that the first screw and the second screw are screwed into the wall easily via the aperture, thus avoiding hammering the first screw and the second screw into the wall.

To obtain the above objective, an expandable fixing device provided by the present invention contains: a first screw and a second screw.

The first screw includes a first head portion and a first extension extending downwardly from a bottom of the first head portion, the first extension has first threads formed on an outer wall of the first extension, the first screw further includes a screwing orifice defined in the first head portion and multiple slots formed on a distal end of the first extension, and the first extension has multiple expansion portions formed on the distal end of the first extension and intersecting with the multiple slots.

The second screw includes a second head portion and a second extension extending downwardly from a bottom of the second head portion, and the second extension has second threads formed on an outer wall of the second extension, wherein the second extension of the second screw has a strike stem.

The second extension of the second screw inserts into the screwing orifice via a top of the first screw and pushes the multiple expansion portions to expand outwardly.

Preferably, the screwing orifice of the first screw is in communication with the multiple slots.

Preferably, the screwing orifice of the first screw has a threaded section and a non-threaded section.

Preferably, a distal end of the strike stem is in a bullet shape.

Preferably, after the second screw screws with the first screw, the second head portion of the second screw contacts on the first head portion of the first screw.

DETAILED DESCRIPTION OF THE PREFERRED EMBODIMENTS

Figure 1:
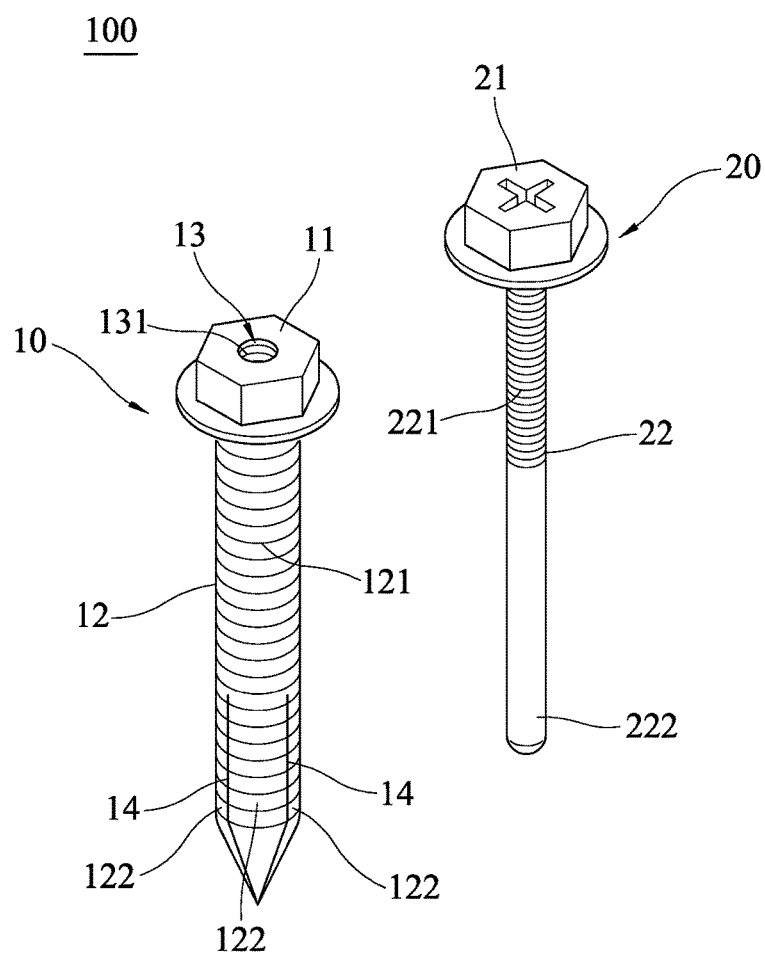
FIG. 1 is a perspective view showing the exploded components of an expandable fixing device according to a preferred embodiment of the present invention.
Figure 2:
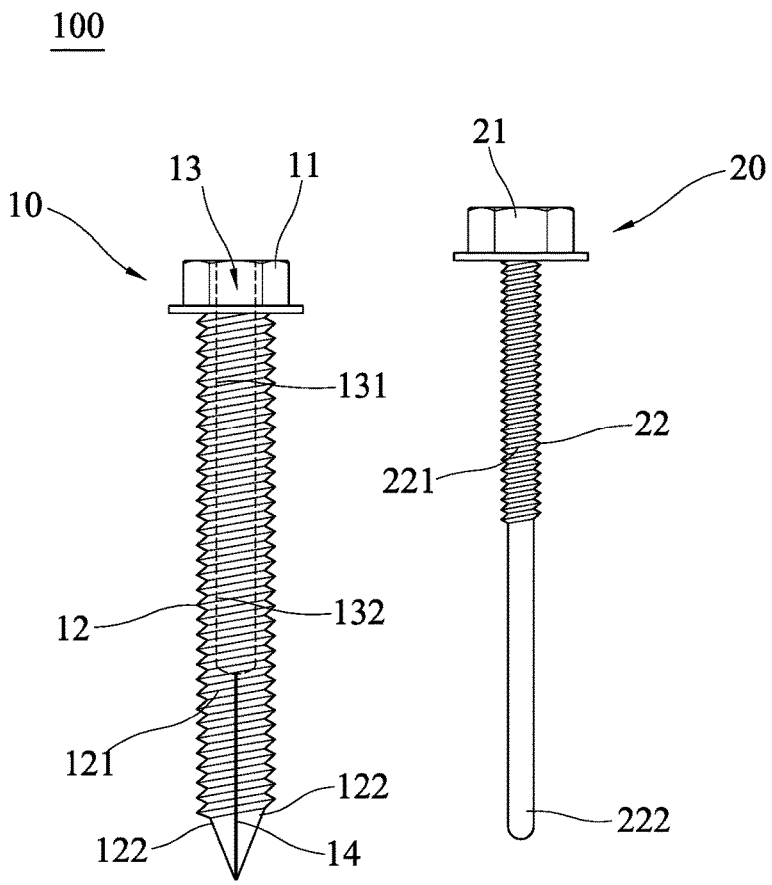
FIG. 2 is a side plane view showing the exploded components of the expandable fixing device according to the preferred embodiment of the present invention.

With reference to FIGS. 1-2, an expandable fixing device 100 according to a preferred embodiment of the present invention comprises: a first screw 10 and a second screw 20.

The first screw 10 includes a first head portion 11 and a first extension 12 extending downwardly from a bottom of the first head portion 11, wherein the first extension 12 has first threads 121 formed on an outer wall of the first head portion 11, the first screw 10 further includes a screwing orifice 13 defined in the first extension 12 and multiple slots 14 formed on a distal end of the first extension 12, wherein the first extension 12 has multiple expansion portions 122 formed on the distal end thereof and intersecting with the multiple slots 14, the screwing orifice 13 of the first screw 10 is in communication with the multiple slots 14 and has a threaded section 131 and a non-threaded section 132.

The second screw 20 includes a second head portion 21 and a second extension 22 extending downwardly from a bottom of the second head portion 21, and the second extension 22 has second threads 221 formed on an outer wall of the second extension 22, wherein the second extension 22 of the second screw 20 has a strike stem 222, a distal end of which is in a bullet shape.

Figure 3:
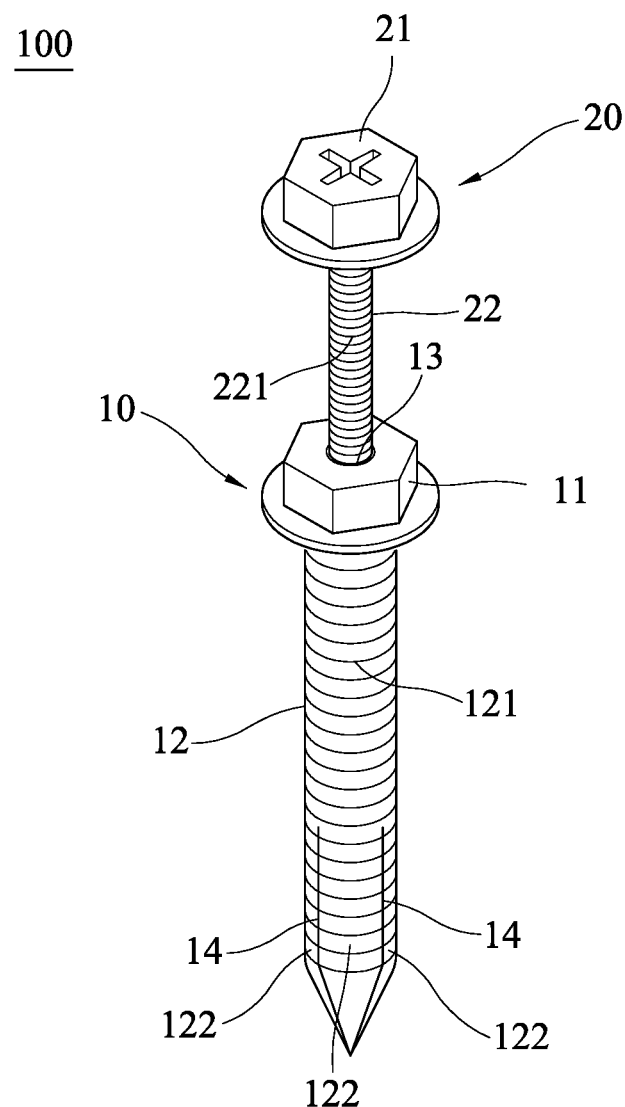
FIG. 3 is a perspective view showing the assembly of the expandable fixing device according to the preferred embodiment of the present invention.

Referring further to FIG. 3, the second extension 22 of the second screw 20 inserts into the screwing orifice 12 via a top of the first screw 10 and pushes the multiple expansion portions 122 to expand outwardly.

FIGS. 4-7 are cross sectional views illustrating the expandable fixing device 100 being fixed to a wall 30 according to the preferred embodiment.

Figure 4:
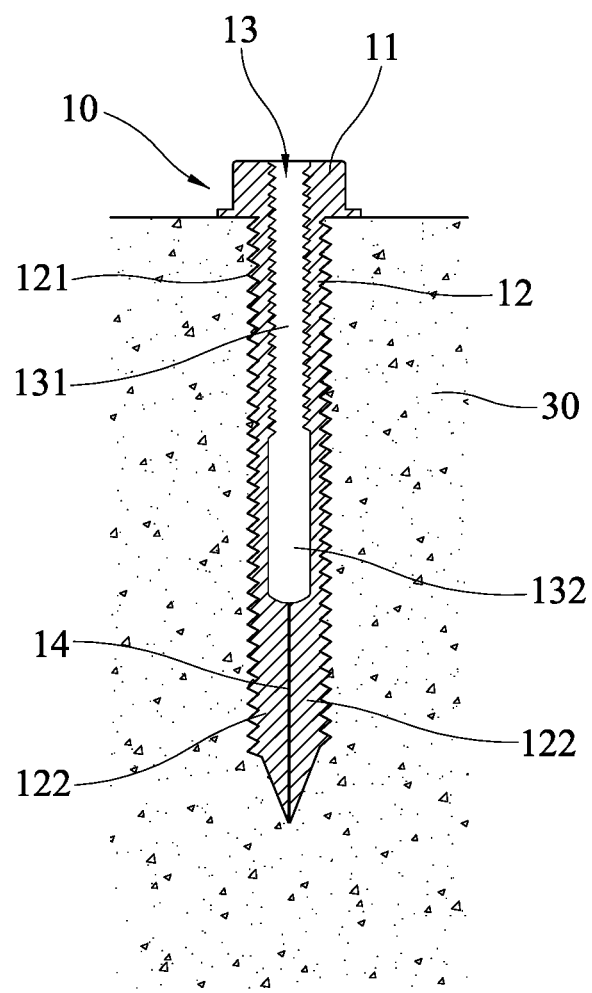
FIG. 4 is a cross sectional view showing the operation of the expandable fixing device according to the preferred embodiment of the present invention.

As shown in FIG. 4, the first screw 10 is locked on the wall via an aperture of the wall 30 by using an electric screwdriver.

Figure 5:
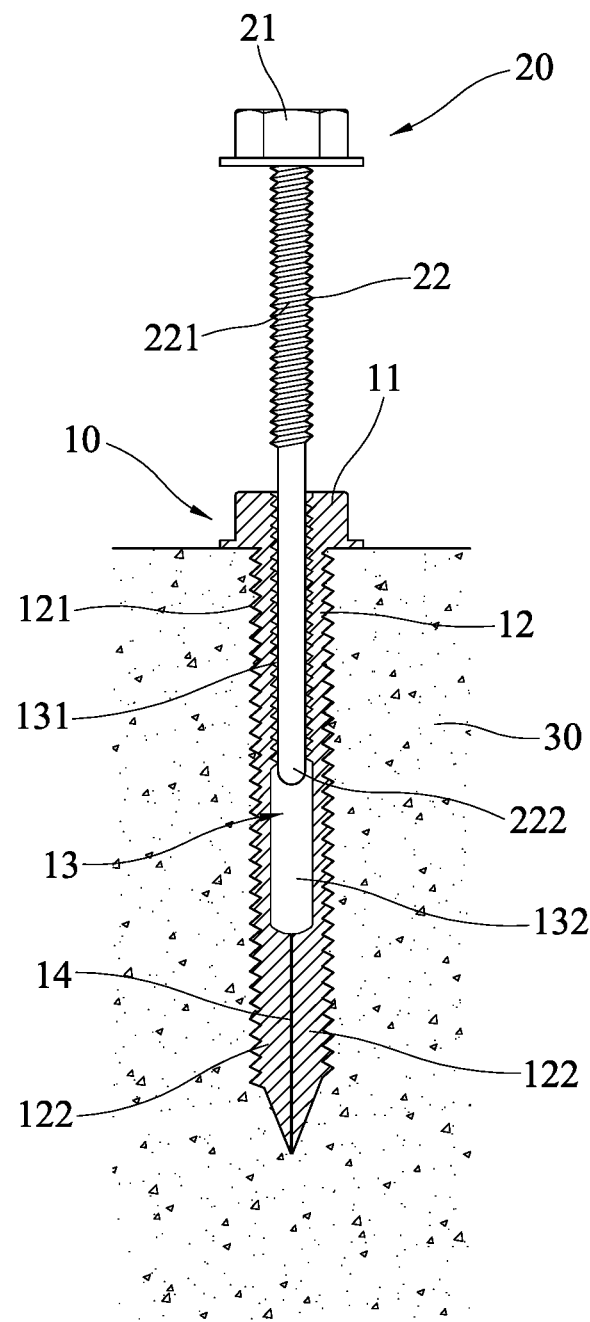
FIG. 5 is another cross sectional view showing the operation of the expandable fixing device according to the preferred embodiment of the present invention.
Figure 6:
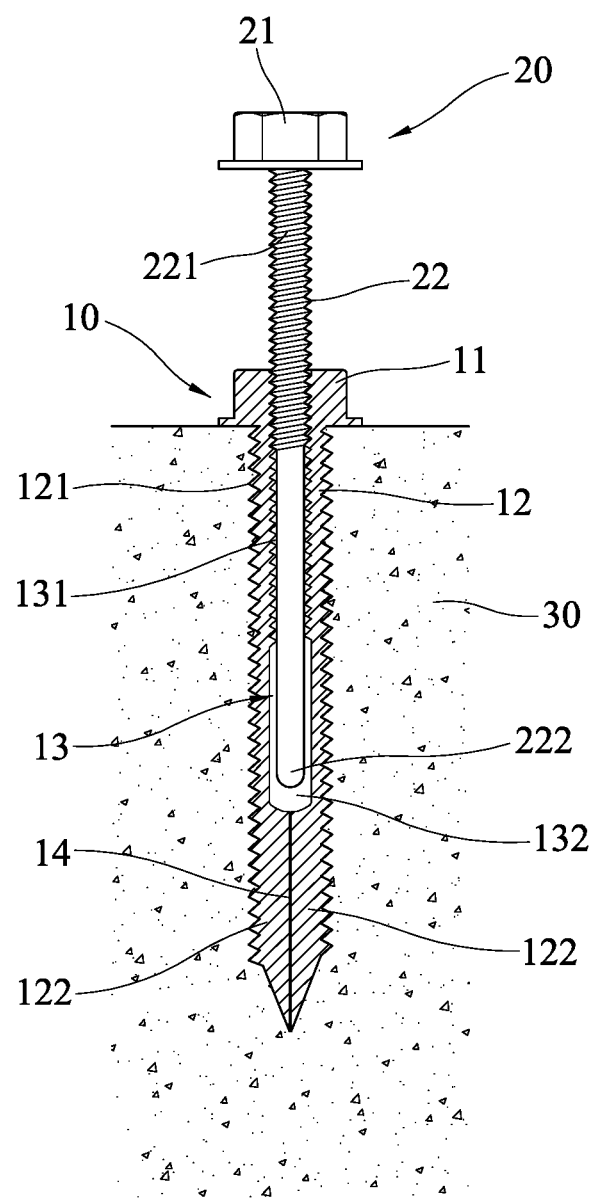
FIG. 6 is also another cross sectional view showing the operation of the expandable fixing device according to the preferred embodiment of the present invention.

Referring further to FIGS. 5 and 6, the second screw 20 is inserted into the screwing orifice 13 of the first screw 10 so that the second threads 221 of the second extension 22 of the second screw 20 screw with the threaded section 131 of the screwing orifice 13 of the first screw 10, thus screwing the second screw 20 with the first screw 10.

Figure 7:
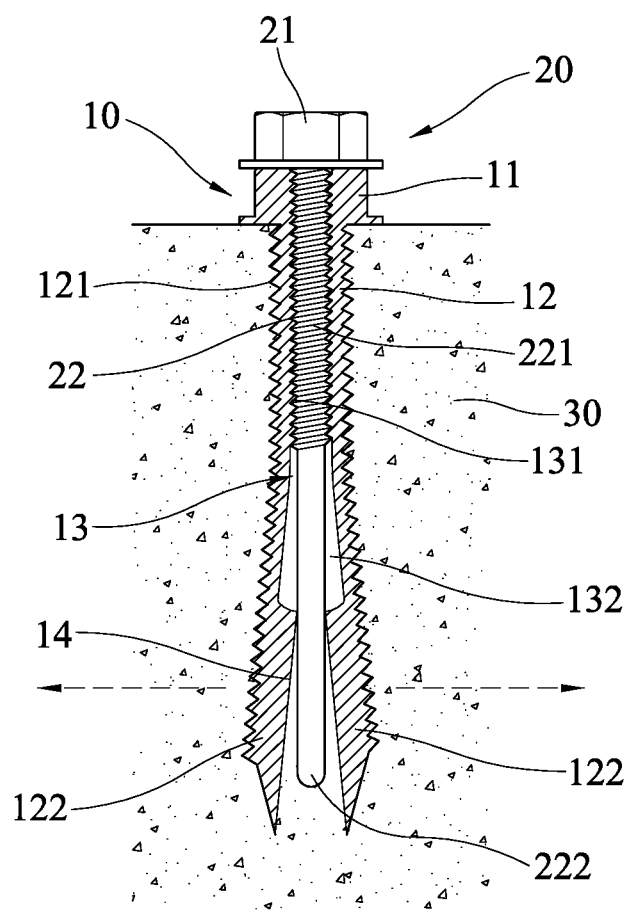
FIG. 7 is still another cross sectional view showing the operation of the expandable fixing device according to the preferred embodiment of the present invention.

As shown in FIG. 7, the electric screwdriver rotates the second screw 20 downwardly so that the strike stem 222 abuts against a bottom of the screwing orifice 13 and forces the multiple expansion portions 122 of the first extension 12 to expand outwardly, hence the first threads 121 of the first head portion 11 retains into the wall 30. After the second screw 20 screws with the first screw 10, the second head portion 21 of the second screw 20 contacts on the first head portion 11 of the first screw 10.

As desiring to remove the expandable fixing device 100 from the wall 30, the first screw 10 and the second screw 20 are rotated reversely so as to remove from the wall 30.

Thereby, the expandable fixing device 100 is comprised of the first screw and the second screw, and the aperture is drilled on the wall so that the first screw and the second screw are screwed into the wall easily via the aperture, thus avoiding hammering the first screw and the second screw into the wall.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An expandable fixing device comprising:
   a first screw including a first head portion and a first extension extending downwardly from a bottom of the first head portion, the first extension having first threads formed on an outer wall of the first extension, the first screw further including a screwing orifice defined in the first head portion and multiple slots formed on a distal end of the first extension, a bottom of the screwing orifice having an arc concave surface, and the first extension having multiple expansion portions formed on the distal end of the first extension and intersecting with the multiple slots;
   a second screw including a second head portion and a second extension extending downwardly from a bottom of the second head portion, and the second extension having second threads formed on an outer wall of the second extension, wherein the second extension of the second screw has a strike stem, a distal end of the strike stem is in a bullet shape with an arc convex surface, and a position of a perimeter of the arc convex surface is higher than a position of a central region of the arc convex surface; and
   wherein the second extension of the second screw inserts into the screwing orifice via a top of the first screw and uses the arc convex surface to abut against the arc concave surface, thereby pushing the multiple expansion portions to expand outwardly, and after the second screw screws with the first screw, the second head portion of the second screw is stacked on the first head portion of the first screw.

2. The expandable fixing device as claimed in claim 1, wherein the screwing orifice of the first screw is in communication with the multiple slots.

3. The expandable fixing device as claimed in claim 1, wherein the screwing orifice of the first screw has a threaded section and a non-threaded section.

* * * * *